No. 647,109. Patented Apr. 10, 1900.
J. G. OXNARD & W. BAUR.
PROCESS OF MAKING SUGAR.
(Application filed Apr. 19, 1897.)

(No Model.)

WITNESSES
Howell Bartle
Chapman W. Fowler

INVENTORS
James G. Oxnard,
Wilhelm Baur,
by T. Walter Fowler
their Attorney

UNITED STATES PATENT OFFICE.

JAMES G. OXNARD AND WILHELM BAUR, OF NEW YORK, N. Y., ASSIGNORS TO THE OXNARD CONSTRUCTION COMPANY, OF WEST VIRGINIA.

PROCESS OF MAKING SUGAR.

SPECIFICATION forming part of Letters Patent No. 647,109, dated April 10, 1900.

Application filed April 19, 1897. Serial No. 632,762. (No specimens.)

*To all whom it may concern:*

Be it known that we, JAMES G. OXNARD, a citizen of the United States, and WILHELM BAUR, a subject of the Emperor of Germany, both residents of New York, in the county of New York and State of New York, have invented certain new and useful Improvements in Processes of Manufacturing Yellow Clarified Sugar, of which the following is a specification.

Our invention relates to a process of manufacturing standard yellow clarified sugars (of about ninety-seven polarization) from sugar-cane without making at any stage of the process an inferior or lower grade of sugar which has to be remelted.

Our invention consists, essentially, in producing in a straight strike a yellow clarified masse-cuite from clarified cane-juice, then taking the first molasses (green syrup) and clairce purged from this masse cuite and clarifying and combining the same with fresh cane-juice and boiling to produce a second clarified masse-cuite, then purging this second masse-cuite and washing the same to yellow clarified sugar and separately collecting the final molasses and the clairce obtained from washing the masse-cuite, and clarifying and filtering the said clairce and combining it with a portion of fresh cane-juice and the first molasses (green syrup) and clairce of the first masse-cuite, thereby making from the second masse-cuite a masse-cuite producing a yellow clarified sugar of a standard substantially equal to the yellow clarified sugar produced by the first masse-cuite.

Figure 1:
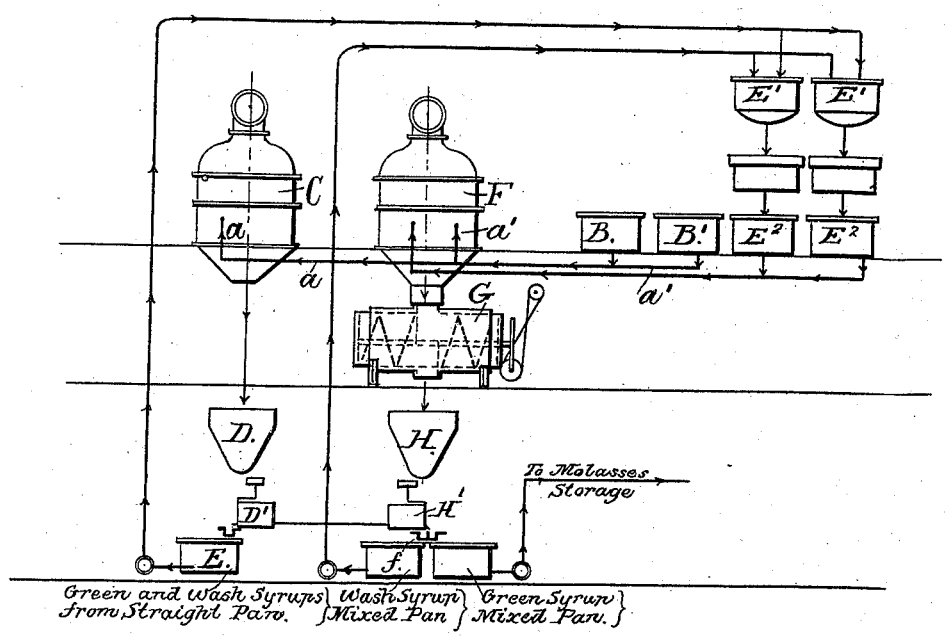
Figure 2:
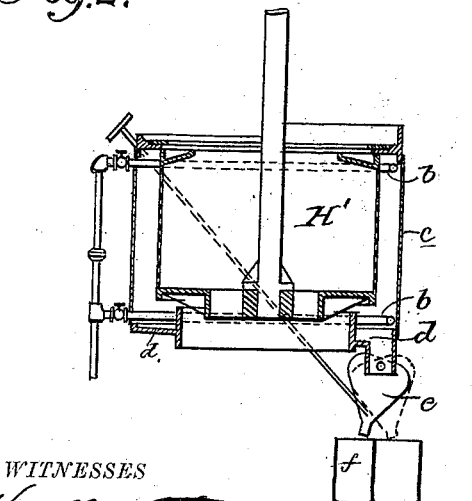
Figure 3:
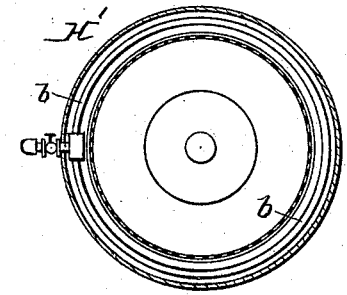

In the drawings hereto annexed, Figure 1 illustrates a diagrammatic figure of an apparatus by which our process may be carried out. Figs. 2 and 3 are vertical and horizontal sectional views of the centrifugal.

The object of our invention is to extract all of the sugar-containing juices from cane and to manipulate these juices so that all the sugar obtainable from the juices will be in the form of yellow clarified sugar and final molasses.

We will now describe our process in full, reference being had to the accompanying drawings.

The juice, which has been clarified and concentrated in the ordinary manner, is received into the tanks B B' as a thick clarified juice. A portion of this juice is then led by a pipe $a$ to the vacuum-pan C and boiled therein for a yellow clarified sugar. Another portion— that remaining in tank B', for instance—is reserved for use at a subsequent stage, as will presently be indicated. This pan C we hereinafter refer to as the "straight" pan to distinguish it from the "mixed" pan F. The masse-cuite produced in the straight pan C is discharged into an open mixer D, cooled by water or other means, and then spun off or purged and washed in centrifugals D'. The sugar remaining in the centrifugals will be a yellow clarified sugar and ready for the market.

The first molasses (green syrup) and clairce, which have been purged from the masse-cuite by the centrifugal action of the machines, are collected in a tank or vessel E and diluted with water to about the density of the thick juice, clarified and filtered in the usual manner, and are then ready to be boiled in the vacuum-pan F with that part of the thick juice reserved for this purpose, as before mentioned. To further this operation, the tank B', containing the portion of the thick juice originally reserved, is connected with the pan F by means of a pipe $a'$, and the first molasses and clairce in the tank or vessel E are pumped or otherwise delivered into the blow-ups E' and will be clarified, as usual, and delivered into storage-tanks $E^2$ and finally into the mixed vacuum-pan F with the aforesaid reserved or fresh thick juice, whereby the degree of purity of the first molasses and clairce is raised. The mixture in the pan F is about five to six points lower in purity than that in the straight pan and is boiled in this vacuum-pan F for yellow clarified sugar masse-cuite, together with the clairce obtained from washing a previous pan of the same kind, as we will presently disclose. The masse-cuite of this mixed vacuum-pan F is dropped into a closed vessel G, provided with a cooling-jacket and means for stirring the masse-cuite, and is left therein for about eighteen to thirty hours to enable it to be cooled to a temperature of between 90° and 100° Fahrenheit and is then discharged into a centrifugal mixer H of any suitable and well-known type and washed to yellow clarified sugar and spun off or purged in the centrifugals H', which are fully shown, described, and claimed in an application filed by us June 18, 1897, Serial No. 641,307. In this instance, however, the centrifugals H' are provided with perforated coils b, which are arranged in such a manner that by means of steam or hot water forced through the coils and perforations the inner walls of the outer basket c, as well as the collecting-gutter d at the bottom, are thoroughly washed and freed from the syrup adhering to them. The gutter d has preferably a movable nozzle e to enable the operator to direct the outflow of the various syrups coming from this centrifugal into different channels or gutters, the purpose of which arrangement will be manifest from the following: The masse-cuite is dropped from the mixer H into the centrifugal H', of which the inner wall of the outer basket and gutter has been washed, as just described, and the centrifugal is run until the final molasses stops running from the masse-cuite. If the masse-cuite from the mixed pan has been treated as above described, it will be found that the molasses resulting from the treatment is of final-molasses purity and all the sugar obtained from the masse-cuite is a standard quality of yellow clarified sugar, without making at any stage of the process another or inferior kind of sugar which has to be remelted. In other words, all the juices and syrups will be boiled into a masse-cuite, which will produce a yellow clarified sugar and final molasses, without the necessity of boiling any of the sugar solution to any lower grade of sugar, so that the only products made by our process are a standard-quality yellow clarified sugar and molasses. Before the steam or water is turned on in the coils b the movable outlet or nozzle e may be turned to discharge into a second gutter or trough f to carry off the clairce obtained from washing the masse-cuite. After the sugar remaining in the centrifugal is washed to the desired standard and before the machine is stopped the water or steam should be turned on in the outer basket and the collecting-gutter thereof thoroughly cleansed to remove all particles of high-testing washed syrups. The clairce received into the trough f is to be delivered by a pump, for instance, into the blow-ups E', and clarified and received into the tanks E², and finally sent to the mixed pan, as before alluded to. By this means we recover all of the sugar-containing juices from the cane and utilize them to produce a yellow clarified sugar, and we do this without making at any period of the process any grade of sugar inferior to or lower than standard yellow sugar or which requires remelting.

Having thus described our invention, what we claim as new, and desire to secure by Letters Patent, is—

1. The process herein described of manufacturing yellow clarified sugar from cane-juice which consists, essentially, in producing a yellow clarified masse-cuite from clarified cane-juice; then taking the first molasses (green syrup) and clairce of this masse-cuite and clarifying and combining the same with fresh juice and boiling to produce a second yellow clarified masse-cuite; then purging this masse-cuite and washing the same and collecting the final molasses and the clairce separately, and clarifying and filtering the said clairce and combining this clairce with a portion of fresh juice and the first molasses (green syrup) of the first masse-cuite, for making from the second masse-cuite a masse-cuite producing a yellow clarified sugar of a standard equal to the sugar produced by the first masse-cuite.

2. The process herein described of manufacturing yellow clarified sugar from cane-juice which consists, essentially, in producing a yellow clarified masse-cuite from clarified cane-juice; then taking the first molasses (green syrup) and clairce obtained from this masse-cuite and clarifying and combining the same with fresh juice and boiling to produce a second yellow clarified masse-cuite; then agitating and reducing the temperature of this second masse-cuite; then purging the masse-cuite and washing the same to yellow clarified sugar, and collecting the final molasses and clairce separately; and clarifying and filtering the said clairce and combining this clairce with a portion of fresh cane-juice and the first molasses (green syrup) and clairce of the first masse-cuite, for making from the second masse-cuite a masse-cuite producing a yellow clarified sugar of a standard equal to the sugar produced by the first masse-cuite.

In testimony that we claim the foregoing as our invention we have signed our names, in presence of two witnesses, this 15th day of April, 1897.

JAMES G. OXNARD.
WILHELM BAUR.

Witnesses:
O. G. HAMILTON,
S. D. SCHENCK.